(12) United States Patent
Park

(10) Patent No.: US 12,412,123 B2
(45) Date of Patent: Sep. 9, 2025

(54) ELECTRONIC APPARATUS AND CONTROLLING METHOD THEREOF

(71) Applicant: SAMSUNG ELECTRONICS CO., LTD., Suwon-si (KR)

(72) Inventor: Eunsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 967 days.

(21) Appl. No.: 17/528,605

(22) Filed: Nov. 17, 2021

(65) Prior Publication Data

US 2022/0164707 A1 May 26, 2022

Related U.S. Application Data

(63) Continuation of application No. PCT/KR2021/013671, filed on Oct. 6, 2021.

(30) Foreign Application Priority Data

Nov. 20, 2020 (KR) .................. 10-2020-0156904
Feb. 10, 2021 (KR) .................. 10-2021-0019140

(51) Int. Cl.
*G06N 20/00* (2019.01)
*G06F 9/48* (2006.01)
(Continued)

(52) U.S. Cl.
CPC ........... *G06N 20/00* (2019.01); *G06F 9/4881* (2013.01); *G06F 9/5011* (2013.01); *G06F 9/546* (2013.01);
(Continued)

(58) Field of Classification Search
None
See application file for complete search history.

(56) References Cited

U.S. PATENT DOCUMENTS 8,434,089 B2   4/2013   Kim
8,539,038 B2   9/2013   Jones et al.
(Continued)

FOREIGN PATENT DOCUMENTS

CN     110516817 A  *  11/2019  ............. G06N 20/00
JP     2005-107632 A     4/2005
(Continued)

OTHER PUBLICATIONS

Communication dated Jan. 24, 2022, issued by the International Searching Authority in counterpart International Application No. PCT/KR2021/013671(PCT/ISA/210 and PCT/ISA/237).

*Primary Examiner* — Charles E Anya
(74) *Attorney, Agent, or Firm* — Sughrue Mion, PLLC

(57) ABSTRACT

An electronic device may include a communicator and a processor configured to, based on characteristic information of a dataset for performing a job included in a queue, identify a type of a preloader configured to preload the dataset, and control the communicator to transmit the preloader of the identified type to at least one computing device among a plurality of computing devices. The job may be related to performing training of an AI model by using the dataset. The preloader of a first type may copy the dataset stored in at least one external storage device and store the dataset in the at least one computing device, and the preloader of a second type may generate a connecting link for the dataset stored in the at least one external storage and store the connecting link in the at least one computing device.

9 Claims, 10 Drawing Sheets

(51) Int. Cl.
*G06F 9/50* (2006.01)
*G06F 9/54* (2006.01)

(52) U.S. Cl.
CPC .. *G06F 2209/501* (2013.01); *G06F 2209/506* (2013.01)

(56) References Cited

U.S. PATENT DOCUMENTS

| | | |
|---|---|---|
| 8,732,355 B1 | 5/2014 | Chan et al. |
| 8,762,456 B1 | 6/2014 | Chan et al. |
| 10,025,809 B2 | 7/2018 | Petit et al. |
| 2008/0211822 A1 | 9/2008 | Kim |
| 2015/0379430 A1* | 12/2015 | Dirac ............... G06N 20/00 706/12 |
| 2017/0163759 A1 | 6/2017 | Acharya et al. |
| 2017/0364570 A1* | 12/2017 | Jacob ............... G06N 5/022 |
| 2019/0121673 A1* | 4/2019 | Gold ............... G06F 9/4881 |
| 2019/0187919 A1 | 6/2019 | Derr et al. |
| 2019/0196971 A1 | 6/2019 | Pham et al. |
| 2019/0317802 A1 | 10/2019 | Bachmutsky et al. |
| 2020/0005187 A1* | 1/2020 | Bendre ............... H04L 67/60 |
| 2020/0042362 A1* | 2/2020 | Cui ............... G06V 10/82 |
| 2020/0159589 A1* | 5/2020 | Capes ............... G06N 7/08 |
| 2020/0302234 A1* | 9/2020 | Walters ............... G06F 16/9035 |
| 2021/0357749 A1* | 11/2021 | Kim ............... G06N 3/08 |

FOREIGN PATENT DOCUMENTS

| | | |
|---|---|---|
| KR | 10-0348909 B1 | 12/2002 |
| KR | 10-0460009 B1 | 12/2004 |
| KR | 10-1852610 B1 | 4/2018 |

\* cited by examiner

ELECTRONIC APPARATUS AND CONTROLLING METHOD THEREOF

CROSS-REFERENCE TO RELATED APPLICATION(S)

This application is a bypass continuation of International Application No. PCT/KR2021/013671, filed on Oct. 6, 2021, which is based on and claims priority to Korean Patent Application No. 10-2020-0156904, filed on Nov. 20, 2020 and Korean Patent Application No. 10-2021-0019140, filed on Feb. 10, 2021, in the Korean Intellectual Property Office, the disclosure of which are incorporated by reference herein in their entireties.

BACKGROUND

1. Field

The disclosure relates to an electronic apparatus and a controlling method thereof, and more particularly, to an electronic apparatus for improving efficiency of artificial intelligence (AI) learning and a controlling method thereof.

2. Description of the Related Art

Recently, cloud platforms provide a service of training an artificial intelligence (AI) model by utilizing big data to users (e.g., developers or researchers of AI models, corporations that provide services by using AI models, etc.).

A cloud platform includes a data cluster (e.g., at least one storage device including storages such as a hard disk drive (HDD), a solid state drive (SSD), etc.) for storing a large amount of learning data and a computing cluster (e.g., at least one computing device including processors such as a graphics processing unit (GPU), a central processing unit (CPU), a neural processing unit (NPU), etc.) for performing an operation of training an AI model (e.g., a training task).

The computing cluster performs training of an AI model such as deep learning by using learning data stored in the data cluster, and in the process, a large scale data transmission between the clusters may be performed through a network.

The computing cluster may approach the data cluster through the network when training of an AI model, and load the learning data stored in the data cluster. Here, in a case where a delay of the network occurs, the speed of the computing cluster of loading the learning data stored in the data cluster may become slow. Accordingly, a bottleneck phenomenon may occur, and the speed of training the AI model may also become slow. That is, even if the processor of the computing cluster has the capacity to process more data, learning data to be used for training of the AI model is not prepared, and thus there is a problem that the job efficiency of the processor becomes lower.

Meanwhile, after learning data is stored in a memory (or a local storage) inside a computing device, a separate computing device may perform training of an AI model by using the learning data stored in the memory. In this case, each computing device can only perform training of the AI model by using the stored learning data, but cannot use other learning data, and thus there is a problem that dependency between the processor and the memory occurs. Also, in a case where the operating capacity or the storage space of a computing device storing specific learning data is insufficient, the computing device needs to be replaced with a new computing device, and thus expandability is degraded.

Further, a local cache (or a memory, or a storage) may be provided in each computing device, and learning data to be used for training of an AI model may be received from the data cluster and stored in the local cache, and then training of the AI model may be performed by using the learning data stored in the local cache. However, in a case where several computing devices train an AI model by using the same learning data, locality of the cache is not considered, and thus overlapping of data may occur, and the storage spaces of the computing devices may be wasted. Also, a case where the local cache cannot be used or there is no benefit of the local cache may occur, such as a case where the file size of learning data is greater than the capacity of the local cache.

SUMMARY

Example embodiments of the disclosure address the aforementioned problem, and provide an electronic apparatus for improving efficiency of artificial intelligence (AI) learning in a cloud platform, and a controlling method thereof.

According to an aspect of an example embodiment, provided is an electronic apparatus including: a communication interface; and a processor configured to: based on characteristic information of a dataset to be used to perform a job included in a queue, identify a type of a preloader configured to preload the dataset; and control the communication interface to transmit the preloader of the identified type to at least one computing device among a plurality of computing devices, wherein the preloader includes a preloader of a first type and a preloader of a second type, wherein the preloader of the first type is configured to copy the dataset stored in at least one external storage device and store the dataset in the at least one computing device, wherein the preloader of the second type is configured to generate a connecting link for the dataset stored in the at least one external storage device and store the connecting link in the at least one computing device, and wherein the job relates to performing training of an artificial intelligence (AI) model by using the at least one computing device based on the dataset.

The characteristic information of the dataset may include at least one of a size of the dataset or a number of files of the dataset.

The processor may be further configured to: based on the number of files included in the dataset being greater than or equal to a predetermined number, control the communication interface to transmit the preloader of the first type to the at least one computing device, and based on the number of files included in the dataset being smaller than the predetermined number, control the communication interface to transmit the preloader of the second type to the at least one computing device.

The processor may be further configured to: based on the size of the dataset being smaller than a predetermined size, control the communication interface to transmit the preloader of the first type to the at least one computing device, and based on the size of the dataset being greater than or equal to the predetermined size, control the communication interface to transmit the preloader of the second type to the at least one computing device.

The processor may be further configured to: based on preloading information received from the plurality of computing devices through the communication interface, identify at least one computing device in which the dataset is preloaded among the plurality of computing devices.

The processor may be further configured to: based on identifying the at least one computing device in which the dataset is preloaded, control the communication interface to transmit a command for performing the job to the identified at least one computing device.

The processor may be further configured to: based on identifying that there is no computing device in which the dataset is preloaded, adjust the job to be a last order in the queue.

The processor may be further configured to: based on a number of jobs for which the dataset is required in the queue being greater than a number of a computing device in which the dataset is preloaded, control the communication interface to transmit the preloader of the identified type to at least one computing device among remaining computing devices of the plurality of computing devices, excluding the computing device in which the dataset is preloaded.

The processor may be further configured to: based on a number of jobs for which the dataset is required in the queue being smaller than a number of computing devices in which the dataset is preloaded, control the communication interface to transmit a command for deleting the preloader of the identified type to at least one computing device among the computing devices in which the dataset is preloaded.

The processor may be further configured to: based on receiving a user command requesting training of the AI model by using the dataset, arrange the job in the queue.

According to an aspect of an example embodiment, provided is a method of controlling an electronic apparatus, the method including: based on characteristic information of a dataset to be used to perform a job included in a queue, identifying a type of a preloader configured to preload the dataset; and transmitting the preloader of the identified type to at least one computing device among a plurality of computing devices, wherein the preloader includes a preloader of a first type and a preloader of a second type, wherein the preloader of the first type is configured to copy the dataset stored in at least one external storage device and store the dataset in the at least one computing device, wherein the preloader of the second type is configured to generate a connecting link for the dataset stored in the at least one external storage device and store the connecting link in the at least one computing device, and wherein the job is related to performing training of an artificial intelligence (AI) model by using the at least one computing device based on the dataset.

The characteristic information of the dataset may include at least one of a size of the dataset or a number of files of the dataset.

The transmitting may include: based on the number of files included in the dataset being greater than or equal to a predetermined number, transmitting the preloader of the first type to the at least one computing device, and based on the number of files included in the dataset being smaller than the predetermined number, transmitting the preloader of the second type to the at least one computing device.

The transmitting may include: based on the size of the dataset being smaller than a predetermined size, transmitting the preloader of the first type to the at least one computing device, and based on the size of the dataset being greater than or equal to the predetermined size, transmitting the preloader of the second type to the at least one computing device.

The method may further include: based on preloading information received from the plurality of computing devices, identifying at least one computing device in which the dataset is preloaded among the plurality of computing devices.

According to the various embodiments of the disclosure as described above, the disclosure may provide an electronic apparatus for improving efficiency of artificial intelligence (AI) learning in a cloud platform, and a controlling method thereof. Also, the disclosure may adjust the number of computing devices according to the amount of learning data required for training of an AI model, and preload the learning data.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
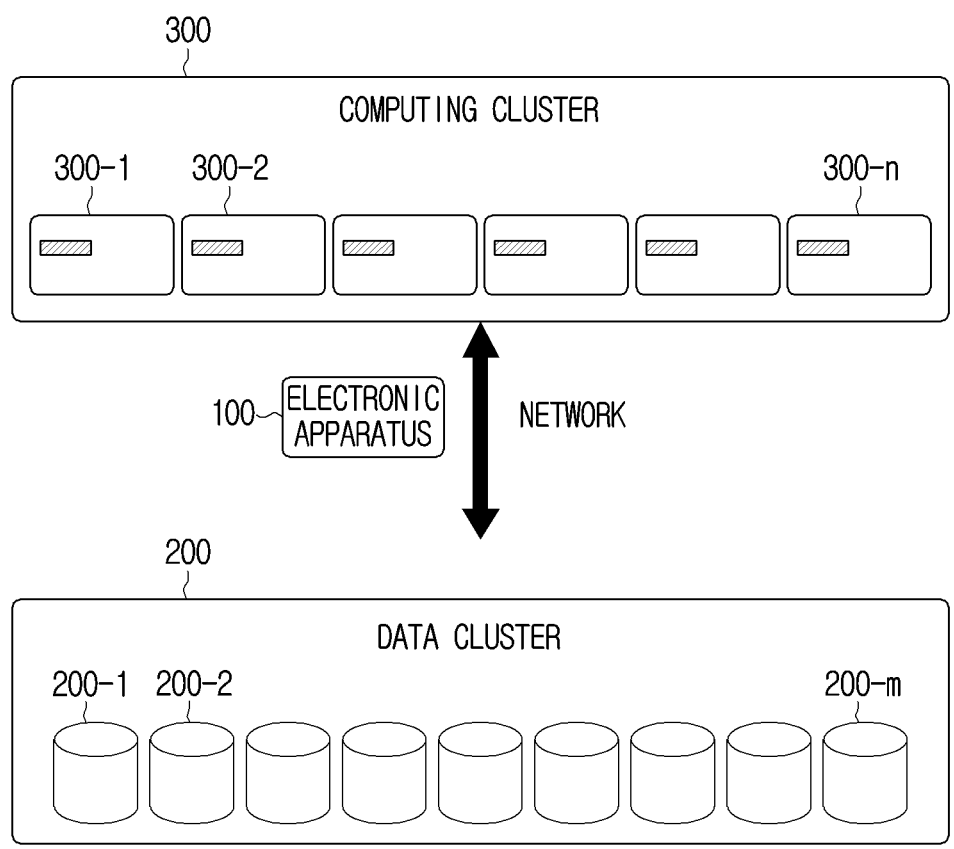
FIG. 1 is a diagram for illustrating a system according to an embodiment of the disclosure.

Hereinafter, embodiments of the inventive concept will be described in detail with reference to the accompanying drawings.

In describing the disclosure, in a case where it is determined that detailed explanation of related known functions or components may unnecessarily confuse the gist of the disclosure, the detailed explanation will be omitted. In addition, the example embodiments below may be modified in various different forms, and the scope of the technical idea of the disclosure is not limited to the example embodiments described below. Rather, these embodiments are provided to make the disclosure more sufficient and complete, and to fully convey the technical idea of the disclosure to those skilled in the art.

The various example embodiments of the disclosure are not for limiting the technology described in the disclosure to a specific embodiment, but they should be interpreted to include various modifications, equivalents, and/or alternatives of the embodiments of the disclosure. With respect to the detailed description of the drawings, similar components may be designated by similar reference numerals.

Also, the expressions "first," "second," and the like used in the disclosure may be used to describe various elements regardless of any order and/or degree of importance. In addition, such expressions are used only to distinguish one element from another element, and are not intended to limit the elements.

Further, in the disclosure, the expressions "A or B," "at least one of A and/or B," or "one or more of A and/or B," and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, in the disclosure, singular expressions also include plural expressions as long as they do not obviously mean differently in the context. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Also, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) may be interpreted to mean that still another element (e.g., a third element) does not exist between the one element and the another element.

In addition, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that may perform (or is adapted to perform) the corresponding operations by executing one or more software programs stored in a memory device.

An electronic apparatus according to the various embodiments of the disclosure may include, for example, at least one of a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. Also, according to the various embodiments of the disclosure, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or a bio-implantable type device (e.g., an implantable circuit).

Also, according to an embodiment of the disclosure, the electronic apparatus may include a home appliance. A home appliance may include, for example, at least one of a television, a digital video disk (DVD) player, an audio, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™, an electronic dictionary, an electronic key, a camcorder, or an electronic photo frame.

In addition, according to another embodiment of the disclosure, the electronic apparatus may include at least one of various types of medical instruments (e.g., various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), flight data recorder (FDR), a vehicle infotainment device, an electronic device for vessels (e.g., a navigation device for vessels, a gyrocompass, etc.), avionics, a security device, a head unit for a vehicle, an industrial or a household robot, an automatic teller's machine (ATM) of a financial institution, a point of sales (POS) of a store, or an Internet of things (IoT) device (e.g., a light bulb, various types of sensors, an electronic or a gas meter, a sprinkler device, a fire alarm, a thermostat, a street light, a toaster, exercise equipment, a hot water tank, a heater, a boiler, etc.).

Further, according to still another embodiment of the disclosure, the electronic apparatus may include at least one of a part of furniture or a building/a structure, an electronic board, an electronic signature receiving device, a projector, or various types of measurement apparatuses (e.g., water, electricity, gas, or radio wave measurement apparatuses, and the like). In various embodiments of the disclosure, an electronic apparatus may be a combination of one or more of the aforementioned various types of apparatuses. Meanwhile, an electronic apparatus according to an embodiment of the disclosure may be a flexible electronic apparatus. Also, an electronic apparatus according to the embodiments of the disclosure is not limited to the aforementioned apparatuses, and it may include a new electronic apparatus according to development of technologies.

FIG. 1 is a diagram for illustrating a system according to an embodiment of the disclosure.

Referring to FIG. 1, a system 10 according to an embodiment of the disclosure stores a large amount of learning data inside a data cluster 200, and a cloud platform may provide a service of training an AI model by a computing cluster 300 by using specific learning data stored in the data cluster 200 according to a user's request.

The system 10 may include an electronic apparatus 100, a data cluster 200, and a computing cluster 300. The electronic apparatus 100, the data cluster 200, and the computing cluster 300 may be connected with one another via various types of networks (e.g., a personal area network (PAN), a local area network (LAN), a metropolitan area network (MAN), a wide area network (WAN), a value added network (VAN), an integrated services digital network (ISDN), an Intranet, an Extranet, the Internet, etc.), and they may transmit or receive data through a network.

The data cluster 200 may include at least one external storage device **200-1, 200-2, . . . , 200-*m* (m is a natural number which is 1 or greater). Each external storage device 200-1, 200-2, . . . , 200-*m* may store various datasets. For this, each external storage device 200-1, 200-2, . . . , 200-*m*** may include a memory (or a storage) such as a hard disk drive (HDD), a solid state drive (SSD), etc.

Here, a dataset refers to a gathering of data, and it may be, for example, a gathering of learning data used in training of an AI model. As an example, a dataset 1 may be a gathering of different photographs including a cat, and a dataset 2 may be a gathering of audio files in which a voice of women in their twenties is recorded. However, this is merely an example embodiment, and various modified embodiments are possible.

An AI model is a model that may be trained according to various algorithms such as supervised learning of inferring a function through learning data wherein specific results (or attributes, categories, etc.) are classified, unsupervised learning of inferring a unique pattern of learning data wherein specific results are not classified, reinforcement learning of analyzing a behavior of an agent and optimizing the behavior based on a feedback from an environment, etc. For example, an AI model may be implemented as various types of AI models such as an artificial neural network, a convolutional neural network (CNN), a recurrent neural network (RNN), a generative adversarial network (GAN), relation networks (RL), etc., and there is no limit to its types or contents.

Figure 5:
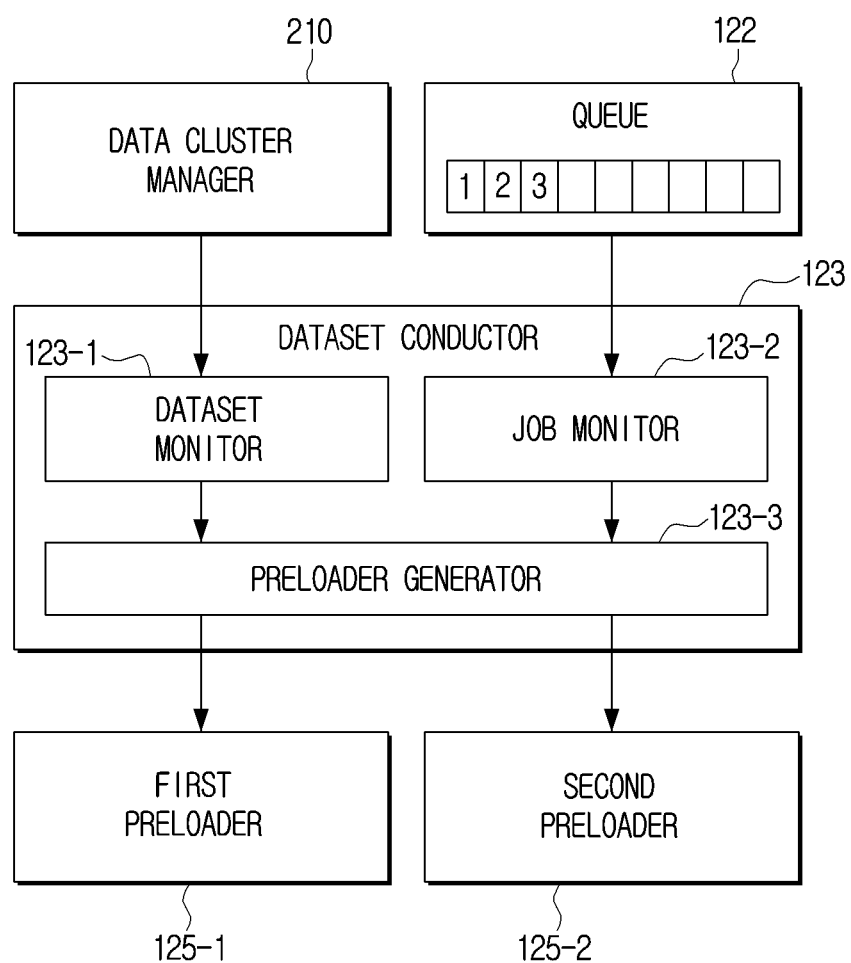
FIG. 5 is a diagram for illustrating a dataset conductor according to an embodiment of the disclosure.

The data cluster 200 may further include a data cluster manager 210 (refer to FIG. 5). The data cluster manager 210 is a device that manages characteristic information of datasets stored in the data cluster 200, and transmits the characteristic information to the electronic apparatus 100. Information on datasets may include information on the types of datasets stored in each external storage device **200-1, 200-2, . . . , 200-*m* (e.g., identification information, addresses on the network, etc.), the sizes of the datasets, the number of files included in the datasets, etc. The data cluster manager 210 may be a separate device from the external storage devices 200-1, 200-2, . . . , 200-*m*, or the data cluster manager 210 may be a device integrated with one of the external storage devices 200-1, 200-2, . . . , 200-*m***.

Each external storage device **200-1, 200-2, . . . , 200-*m* may store datasets in various ways. For example, the first external storage device 200-1 may store the dataset 1, and the second external storage device 200-2 may store the dataset 2. As another example, the first external storage device 200-1 may store the dataset 1, and the second external storage device 200-2 may store the dataset 1 which is identical to the dataset 1 stored in the first external storage device 200-1. As still another example, the first external storage device 200-1 may store a part of the dataset 1, and the second external storage device 200-2 may store another part which is different from the dataset 1 stored in the first external storage device 200-1**.

The computing cluster 300 may include at least one computing device **300-1, 300-2, . . . , 300-*n*** (n is a natural number which is 1 or greater).

Each computing device **300-1, 300-2, . . . , 300-*n* of the computing cluster 300 may perform training of an AI model by using the datasets stored in the data cluster 200 as learning data. For example, the first computing device 300-1 may train a first AI model by using the dataset 1, and the second computing device 300-2 may train a second AI model by using the dataset 2. As another example, the first computing device 300-1 may train the first AI model by using the dataset 1, and the second computing device 300-2 may train the second AI model by using the dataset 1**.

For this, each external storage device **200-1, 200-2, . . . , 200-*m* of the data cluster 200 and each computing device 300-1, 300-2, . . . , 300-*n* of the computing cluster 300 may be connected with one another via a network. That is, each external storage device 200-1, 200-2, . . . , 200-*m* of the data cluster 200 and each computing device 300-1, 300-2, . . . , 300-*n* of the computing cluster 300** may include a communicator (or communication interface) that uses at least one of various communication methods (e.g., a universal serial bus (USB), an Ethernet, optical communication, Thunderbolt, wireless communication, etc.).

Each external storage device **200-1, 200-2, . . . , 200-*m* of the data cluster 200 may be a device that has greater storage capacity of storing data and has faster speed of storing or reading data than each computing device 300-1, 300-2, . . . , 300-*n* of the computing cluster 300. Also, each computing device 300-1, 300-2, . . . , 300-*n* of the computing cluster 300 may be a device that has faster operating capability of processing data than each external storage device 200-1, 200-2, . . . , 200-*m* of the data cluster 200**. However, this is merely an example embodiment, and the disclosure is not limited to the embodiment.

The electronic apparatus 100 according to an embodiment of the disclosure is an apparatus that determines to which computing device in the computing cluster 300 a job (or task) of training of an AI model will be allotted. For example, if a request for training of a first AI model is received, the electronic apparatus 100 may determine a device to train the first AI model as a computing device which currently has a small load in the computing cluster 300, and transmit a command for controlling to perform training of the first AI model to the determined computing device. In this manner, jobs of training various AI models may be to appropriate computing devices, thereby improving learning efficiency of AI models.

Also, the electronic apparatus 100 according to an embodiment of the disclosure may preload datasets stored in at least one external storage device in the data cluster 200 on at least one computing device in the computing cluster 300. Here, preloading refers to an operation of preparing datasets to be used for training of an AI model before a computing device receives a command for controlling to perform training of an AI model. For example, preloading may be understood as an operation of storing datasets (or links) in a local memory (or a storage) of a computing device. Preloaded datasets (or links) are temporarily stored in a local memory (or a storage) of a computing device, and after the datasets are used for training of an AI model, the data sets may be deleted from the local memory (or the storage) of the computing device.

According to the various embodiments of the disclosure as described above, the disclosure may provide an electronic apparatus for improving efficiency of AI learning in a cloud platform, and a controlling method thereof. Hereinafter, the disclosure will be described in more detail.

Figure 2:
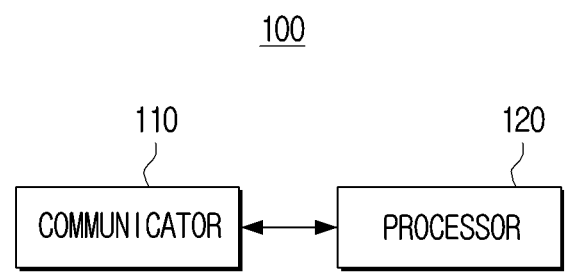
FIG. 2 is a block diagram for illustrating a configuration of an electronic apparatus according to an embodiment of the disclosure.

FIG. 2 is a block diagram for illustrating a configuration of an electronic apparatus according to an embodiment of the disclosure.

Referring to FIG. 2, the electronic apparatus 100 may include a communicator (or communication interface) 110 and a processor 120.

The communicator 110 may transmit data to various external devices or receive data from various external devices. For example, the communicator 110 may be connected with at least one computing device 300-1,

300-2, . . . , 300-*n* via a network. Also, the communicator 110 may be connected with at least one external storage device 200-1, 200-2, . . . , 200-*m* via a network. For this, the communicator 110 may include a circuit for performing communication according to various communication methods (e.g., a universal serial bus (USB), an Ethernet, optical communication, Thunderbolt, wireless communication, etc.).

The processor 120 may control the overall operations of the electronic apparatus 100 or components included in the electronic apparatus 100. Also, the processor 120 may perform an operation of processing data.

For this, the processor 120 may be implemented as a generic-purpose processor such as a central processing unit (CPU), an application processor (AP), etc., a graphic-dedicated processor such as a graphic processing unit (GPU), a vision processing unit (VPU), etc., or an artificial intelligence-dedicated processor such as a neural processing unit (NPU), etc. That is, the processor 120 may be implemented as one of the above, or a combination thereof. Also, the processor 120 may include a volatile memory for loading at least one instruction or module.

The processor 120 may identify a type of a preloader for preloading of a dataset based on characteristic information of a dataset for performing a job included in a queue.

The processor 120 may control the communicator 110 to transmit the preloader of the identified type to at least one computing device 300-1, 300-2, . . . , 300-*n* among a plurality of computing devices 300-1, 300-2, . . . , 300-*n*.

A more detailed content will be described with reference to FIG. 3.

Figure 3:
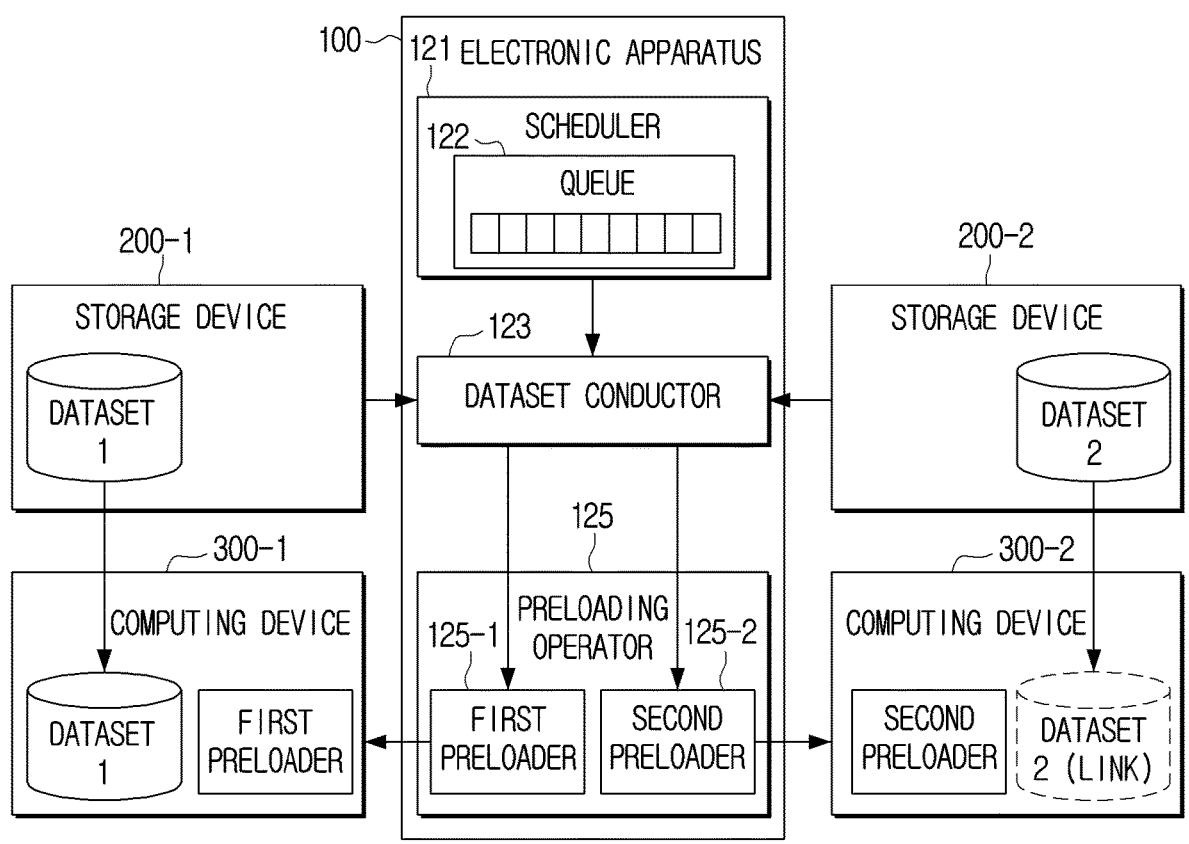
FIG. 3 is a diagram for illustrating in more detail an electronic apparatus according to an embodiment of the disclosure.

FIG. 3 is a diagram for illustrating in more detail an electronic apparatus according to an embodiment of the disclosure.

Referring to FIG. 3, the electronic apparatus 100 may include a scheduler 121, a dataset conductor 123, and a preloading operator 125. In FIG. 3, each of the scheduler 121, the dataset conductor 123, and the preloading operator 125 indicates a state of being executed by the processor 120, and each of the scheduler 121, the dataset conductor 123, and the preloading operator 125 may be a module (or a program) stored in an internal memory of the processor 120 or a memory 130 (refer to FIG. 9) of the electronic apparatus 100.

If a user command requesting training of an AI model is received through the communicator 110, the processor 120 may arrange a job for performing training of the AI model in a queue 122 through the scheduler 121.

Here, the user command requesting training of the AI model may include affinity information of the user for the dataset used in training of the AI model. The dataset is a gathering of data used for training the AI model. That is, the dataset may include at least one data used for training the AI model, and for example, the dataset may be implemented as a gathering in a specific unit including at least one data inside such as a compressed file or a directory (or a folder), etc. The data may refer to various types of data such as images, moving images, texts, audio, statistics, etc., and there is no limit to its types or contents. The affinity information of the user may mean identification information for the dataset (e.g., the name, the type, or the identifier, etc. of the dataset) designated (or selected) by the user among various datasets to be used for training the AI model of the user (e.g., an AI developer, an AI server provider, etc.).

Also, the job arranged by the processor 120 may be a job for performing training of the AI model by using the dataset. Regarding the queue 122, detailed explanation will be made with reference to FIG. 4.

Figure 4:
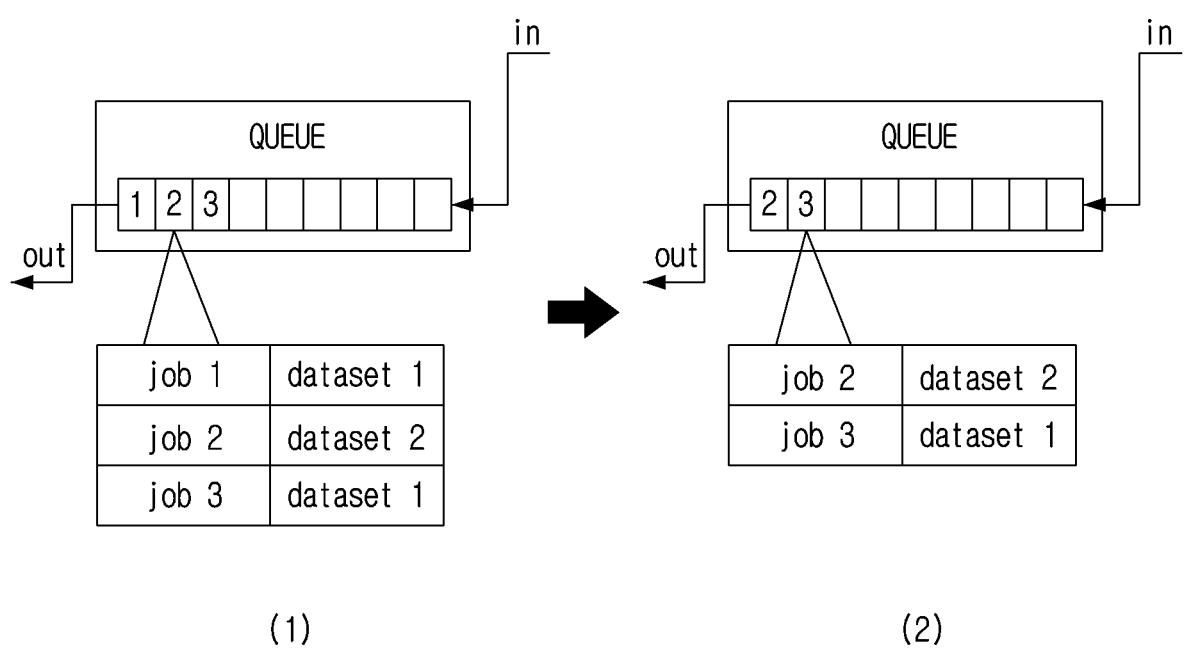
FIG. 4 is a diagram for illustrating a queue according to an embodiment of the disclosure.

FIG. 4 is a diagram for illustrating a queue according to an embodiment of the disclosure.

Referring to (1) in FIG. 4, the queue 122 is a type of computer data structure, and it refers to a First In, First Out (FIFO) structure wherein data (or a job) that is input first is output first. That is, the queue 122 may include information on an execution order of a job, and for example, if a user command requesting training of an AI model is received, the queue 122 may store information on a job for training of the AI model and information on the order (or time) of receipt together. Also, the order in which a job is executed in the queue 122 may be adjusted under a specific condition.

For example, as in (1) in FIG. 4, if a user command requesting training of a first AI learning model by using a dataset 1 is received from a user A (e.g., a terminal device of the user A), the processor 120 may arrange a job 1 to which the dataset 1 is mapped in the queue 122. Afterwards, if a user command requesting training of a second AI learning model by using a dataset 2 is received from a user B, the processor 120 may arrange a job 2 to which the dataset 2 is mapped in the queue 122 in the next order, subsequent to the job 1. Afterwards, in a case where a user command requesting training of a third AI learning model by using the dataset 1 is received from a user C, the processor 120 may arrange a job 3 to which the dataset 1 is mapped in the queue 122 in the next order, subsequent to the job 2.

Also, as in (2) in FIG. 4, the processor 120 may perform a job according to an execution order in the queue 122. For example, the processor 120 may execute the job 1 first among the job 1 to the job 3 according to the execution order in the queue 122, and for a job of which execution order has not arrived, the processor 120 may make the job wait.

The processor 120 may control the computing device to preload datasets required for each job for the entire jobs (e.g., including jobs that are waiting) included in the queue 122. Also, in parallel with this, the processor 120 may control the computing device to perform a job for which a dataset is preloaded (e.g., training of an AI model) according to the execution order in the queue 122. Hereinafter, explanation will be made by distinguishing these aspects for the convenience of explanation.

Referring to FIG. 3 again, the processor 120 may identify a type of a preloader for preloading of a dataset based on characteristic information of the dataset for performing a job included in the queue 122 through the dataset conductor 123.

The preloader may be a program or a module for performing preloading of a dataset, which is to be used for executing a job, before the job is executed according to the order in the queue 122. The preloader may be transmitted to the computing device, and the computing device may store a dataset (or a connecting link connected with the dataset) stored in an external storage device in a local memory of the computing device by storing or executing the received preloader.

The preloader may include a preloader of a first type 125-1 and a preloader of a second type 125-2. The preloader of the first type 125-1 may copy a dataset stored in at least one external storage device 200-1 and store the copied dataset in at least one computing device 300-1 for preloading of the dataset. The preloader of the second type 125-2 may generate a connecting link for a dataset stored in at least one external storage device 200-2 and store the connecting link in at least one computing device 300-2 for preloading of the dataset. The preloader of the first type 125-1 according to the disclosure may also be referred to as a dataset prefetcher, and the preloader of the second type 125-2 may also be referred to as a dataset forwarder.

Here, in an embodiment, characteristic information of a dataset may include at least one of the size of the dataset or the number of files of the dataset. In another embodiment, characteristic information of a dataset may include at least one of the number of external storage devices wherein the dataset is stored, the performance of the network connected to the dataset, or information on the performance of the external storage device in which the dataset is stored.

In an example embodiment, in a case where the number of files included in the dataset 1 is greater than or equal to a predetermined number (e.g., 1000, etc.), the processor 120 may identify (or determine) the type of the preloader as the preloader of the first type 125-1. On the other hand, in a case where the number of files included in the dataset 2 is smaller than the predetermined number (e.g., 1000, etc.), the processor 120 may identify (or determine) the type of the preloader as the preloader of the second type 125-2.

In another example embodiment, in a case where the size of the dataset 1 is smaller than a predetermined size (e.g., 300 mb, etc.), the processor 120 may identify (or determine) the type of the preloader as the preloader of the first type 125-1. On the other hand, in a case where the size of the dataset 2 is greater than or equal to the predetermined size (e.g., 300 mb, etc.), the processor 120 may identify (or determine) the type of the preloader as the preloader of the second type 125-2.

Also, the aforementioned embodiments regarding the number of files included in a dataset and the size of the dataset may be combined with one another to determine the type of the preloader. For example, in a case where the number of files of a dataset is greater than a predetermined number and the size is smaller than a predetermined size, the processor 120 may identify the type of the preloader as the preloader of the first type 125-1. Also, in a case where the number of files of a dataset is smaller than the predetermined number and the size is greater than the predetermined size, the processor 120 may identify the type of the preloader as the preloader of the second type 125-2.

Then, the processor 120 may control the communicator 110 to transmit the preloader of the identified type to at least one computing device 300-1, 300-2, . . . , **300-*n* among the plurality of computing devices 300-1, 300-2, . . . , 300-*n* through the preloading operator 125. Also, the processor 120 may control the communicator 110 to transmit information on the dataset (e.g., the type of the dataset, identification information or the address on the network wherein the dataset is stored, identification information of the external storage device storing the dataset, etc.) to the computing devices 300-1, 300-2, . . . , 300-*n***.

In an example embodiment, in a case where the number of files included in the dataset 1 is greater than or equal to the predetermined number, the processor 120 may control the communicator 110 to transmit the preloader of the first type 125-1 to at least one computing device 300-1. On the other hand, in a case where the number of files included in the dataset 2 is smaller than the predetermined number, the processor 120 may control the communicator 110 to transmit the preloader of the second type 125-2 to at least one computing device 300-2.

In another example embodiment, in a case where the size of the dataset 1 is smaller than the predetermined size, the processor 120 may control the communicator 110 to transmit the preloader of the first type 125-1 to at least one computing device 300-1. On the other hand, in a case where the size of the dataset 2 is greater than or equal to the predetermined size, the processor 120 may control the communicator 110 to transmit the preloader of the second type 125-2 to at least one computing device 300-2.

FIG. 5 is a diagram for illustrating a dataset conductor according to an embodiment of the disclosure.

Referring to FIG. 5, the dataset conductor 123 may include a dataset monitor 123-1, a job monitor 123-2, and a preloader generator 123-3.

The dataset monitor 123-1 may monitor characteristic information of a dataset stored in the data cluster 200. For example, the dataset monitor 123-1 may control the communicator 110 to periodically transmit a command requesting characteristic information of a dataset stored in the data cluster 200 (e.g., at least one external storage device) to a data cluster manager 210. Also, the dataset monitor 123-1 may periodically receive characteristic information of the dataset stored in the data cluster 200 (e.g., at least one external storage device) from the data cluster manager 210.

The job monitor 123-2 may monitor information on a dataset for performing a job included in the queue 122 managed at the scheduler 121. For example, the job monitor 123-2 may request information on an order of a job, and information on a dataset mapped to the job (e.g., information on a dataset required for performing the job) to the scheduler 121, and receive corresponding information from the scheduler 121.

The preloader generator 123-3 may compare information on a dataset for performing a job included in the queue 122 and characteristic information of the dataset stored in the data cluster 200, and determine (or identify) the type of the preloader for preloading the dataset as one of the preloader of the first type 125-1 or the preloader of the second type 125-2.

The preloader generator 123-3 may generate a preloading operator 125 including the preloader of the identified type. That is, the preloading operator 125 may include one preloader between the preloader of the first type 125-1 and the preloader of the second type 125-2. One preloading operator 125 may be generated for each type of a dataset.

Figure 6:
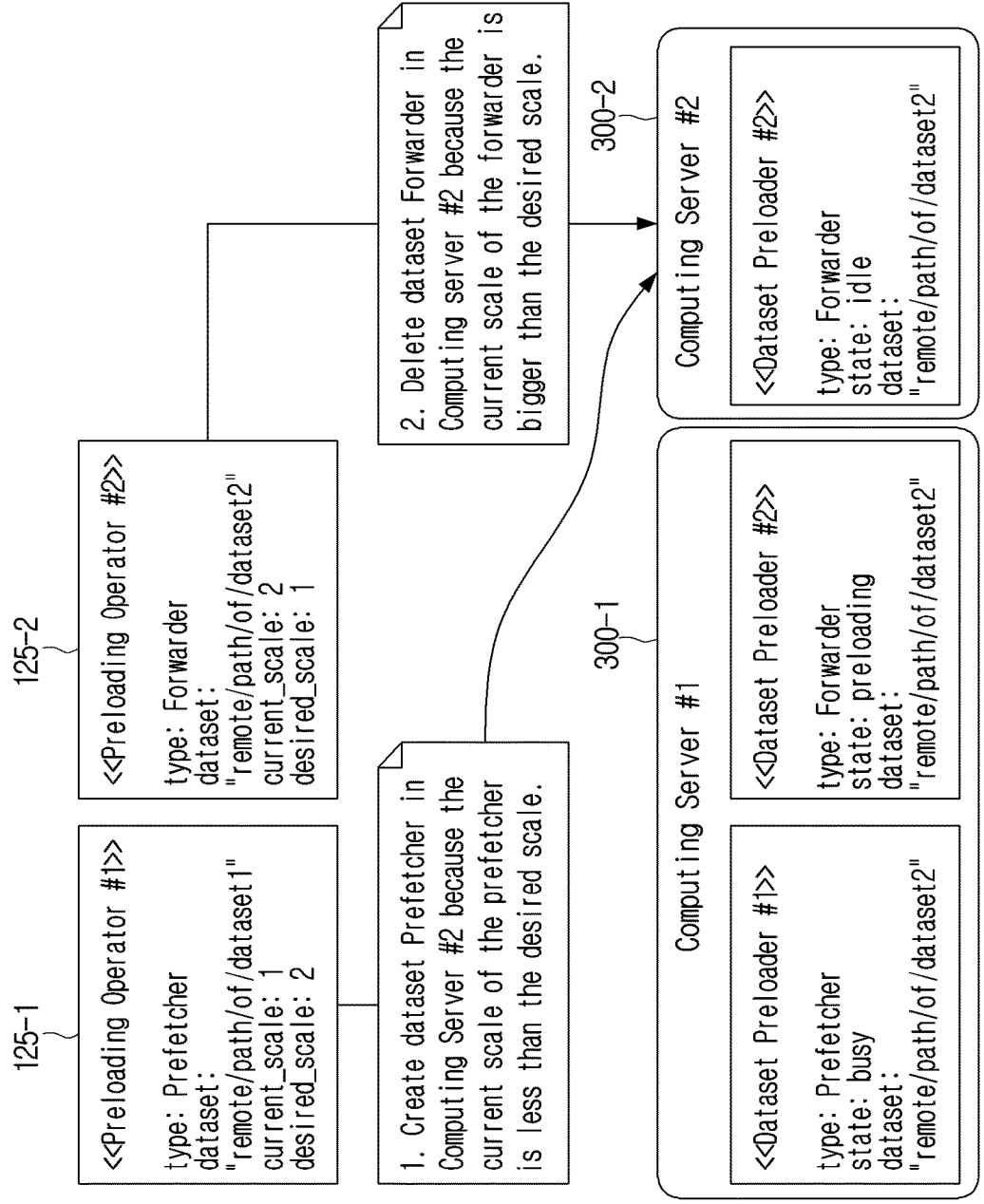
FIG. 6 is a diagram for illustrating a preloading operator according to an embodiment of the disclosure.

FIG. 6 is a diagram for illustrating a preloading operator according to an embodiment of the disclosure.

Referring to FIG. 6, one preloading operator 125 may be generated for each type of a dataset. That is, preloading operators 125 of the same number as the number of the types of datasets may be generated. For example, if the preloader corresponding to the dataset 1 is determined as the preloader of the first type 125-1 according to characteristic information of the dataset 1, a preloading operator 125 corresponding to the dataset 1 may be generated, and the preloading operator 125 corresponding to the dataset 1 may include the preloader of the first type 125-1.

Also, the processor 120 may identify at least one computing device 300-1, 300-2, . . . , **300-*n* in which a dataset is preloaded among the plurality of computing devices 300-1, 300-2, . . . , 300-*n* based on preloading information received from the plurality of computing devices 300-1, 300-2, . . . , 300-*n* through the communicator 110**.

Here, the preloading information of the computing devices 300-1, 300-2, . . . , **300-*n* may be state information indicating whether a dataset corresponding to the preloading operator 125 (e.g., a dataset of the same kind as the preloading operator 125) is preloaded in the computing devices 300-1, 300-2, . . . , 300-*n***. For example, the preloading information may include one of a state in which a dataset is preloaded (a state in which preparation to use a dataset is completed), a state in which a dataset is being preloaded (a state in which a dataset is being prepared to be used), or a busy state (a state in which a job of using a dataset is saturated).

Based on the preloading information received from the plurality of computing devices 300-1, 300-2, ..., 300-n, in a case where the number of jobs for which a dataset is required in the queue 122 is greater than the number of the computing devices 300-1, 300-2, ..., 300-n in which a dataset is preloaded, the processor 120 may control the communicator 110 to transmit the preloader of the identified type to at least one computing device 300-1, 300-2, ..., 300-n among the remaining computing devices 300-1, 300-2, ..., 300-n excluding the computing devices 300-1, 300-2, ..., 300-n in which a dataset is preloaded.

For example, in order for the number of jobs for which a dataset is required in the queue 122 to coincide with the number of the computing devices in which a dataset is currently preloaded, the processor 120 may transmit a command for adding a preloader to at least one computing device 300-1, 300-2, ..., 300-n among the computing devices 300-1, 300-2, ..., 300-n in which a dataset is not preloaded.

On the other hand, based on the preloading information received from the plurality of computing devices 300-1, 300-2, ..., 300-n, in a case where the number of jobs for which a dataset is required in the queue 122 is smaller than the number of the computing devices 300-1, 300-2, ..., 300-n in which a dataset is preloaded, the processor 120 may control the communicator 110 to transmit a command for deleting the preloader of the identified type to at least one computing device 300-1, 300-2, ..., 300-n among the computing devices 300-1, 300-2, ..., 300-n in which a dataset is preloaded.

For example, in order for the number of jobs for which a dataset is required in the queue 122 to coincide with the number of the computing devices in which a dataset is currently preloaded, the processor 120 may transmit a command for deleting a preloader to at least one computing device 300-1, 300-2, ..., 300-n among the computing devices 300-1, 300-2, ..., 300-n in which a dataset is preloaded.

Figure 7:
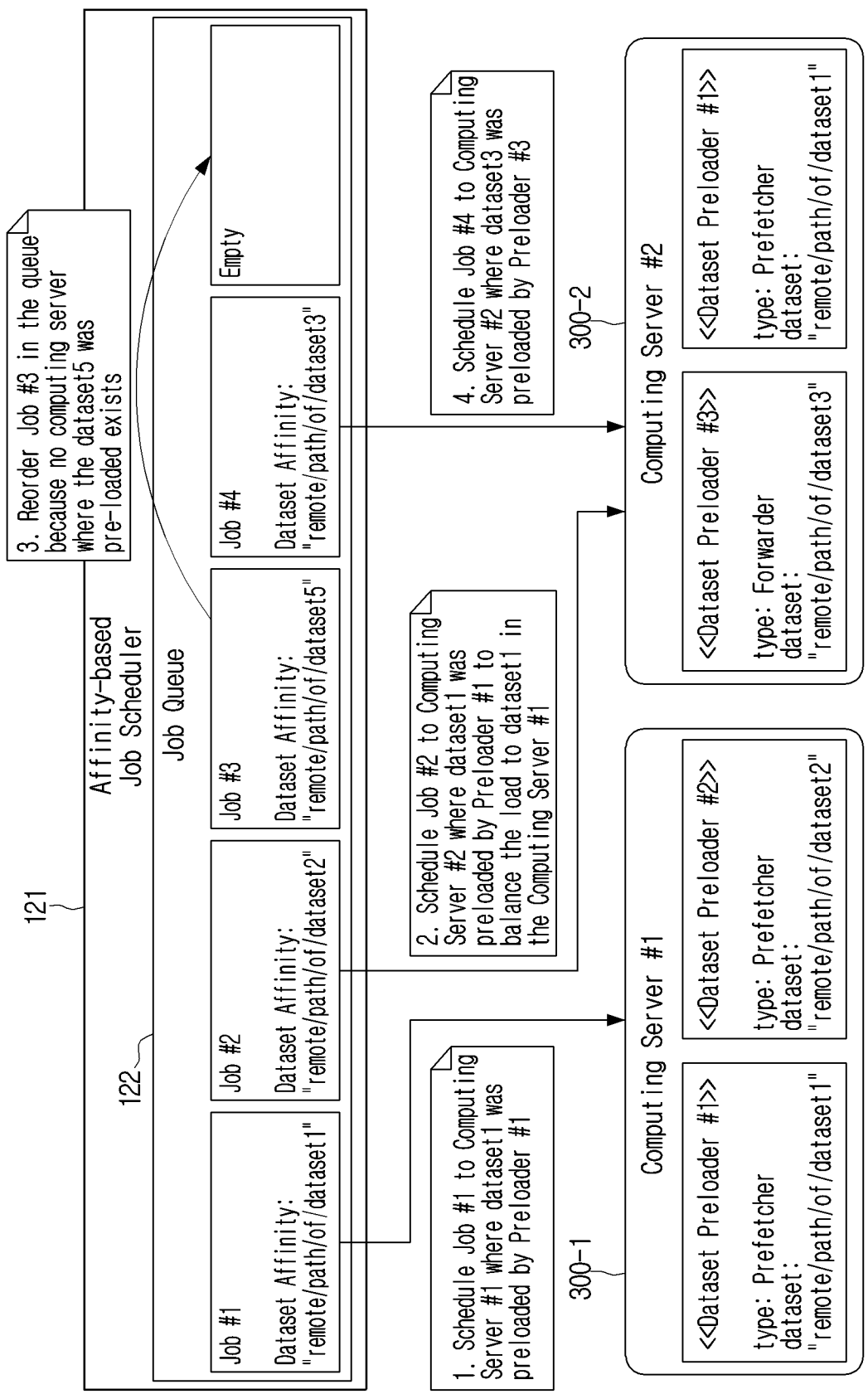
FIG. 7 is a diagram for illustrating a scheduler according to an embodiment of the disclosure.

FIG. 7 is a diagram for illustrating a scheduler according to an embodiment of the disclosure.

Referring to FIG. 7, if a user command requesting training of an AI model by using a dataset is received through the scheduler 121, the processor 120 may arrange a job for performing training of the AI model in the queue. Here, in the user command, affinity information of the user may be included. That is, to the job arranged in the queue, a dataset indicated by the affinity information of the user may be mapped.

In parallel with this, the processor 120 may perform control to perform the job according to the execution order in the queue 122 through the scheduler 121.

Specifically, based on the preloading information received from the plurality of computing devices 300-1, 300-2, ..., 300-n through the communicator 110, the processor 120 may identify at least one computing device 300-1, 300-2, ..., 300-n in which a dataset is preloaded among the plurality of computing devices 300-1, 300-2, ..., 300-n.

When a job is executed according to the order in the queue 122, if at least one computing device 300-1, 300-2, ..., 300-n in which a dataset mapped to the job is preloaded is identified, the processor 120 may control the communicator 110 to transmit a command for performing the job to the identified computing device 300-1, 300-2, ..., 300-n. In this case, the AI model may be trained by the identified computing device 300-1, 300-2, ..., 300-n by using the preloaded dataset according to the command.

For example, when the job 1 is executed according to the order in the queue 122, if the first computing device 300-1 in which the dataset 1 required for the job 1 is preloaded is identified, the processor 120 may control the communicator 110 to transmit a command for performing the job 1 to the identified computing device 300-1.

When a job is executed according to the order in the queue 122, if it is identified that there is no computing device 300-1, 300-2, ..., 300-n in which a dataset is preloaded, the processor 120 may adjust the job to the last order in the queue 122.

For example, when the job 3 is executed according to the order in the queue 122, if it is identified that there is no computing device in which a dataset 5 required for the job 3 is preloaded, the processor 120 may adjust the job 3 to the last order in the queue 122. After adjusting the job 3 to the last order, when the order for executing the job 3 arrives according to the order in the queue 122, the processor 120 may identify whether there is a computing device in which the dataset 5 required for the job 3 is preloaded. Here, if there is no computing device in which the dataset 5 required for the job 3 is preloaded, the processor 120 may adjust the job 3 to the last order in the queue 122 again.

Figure 8:
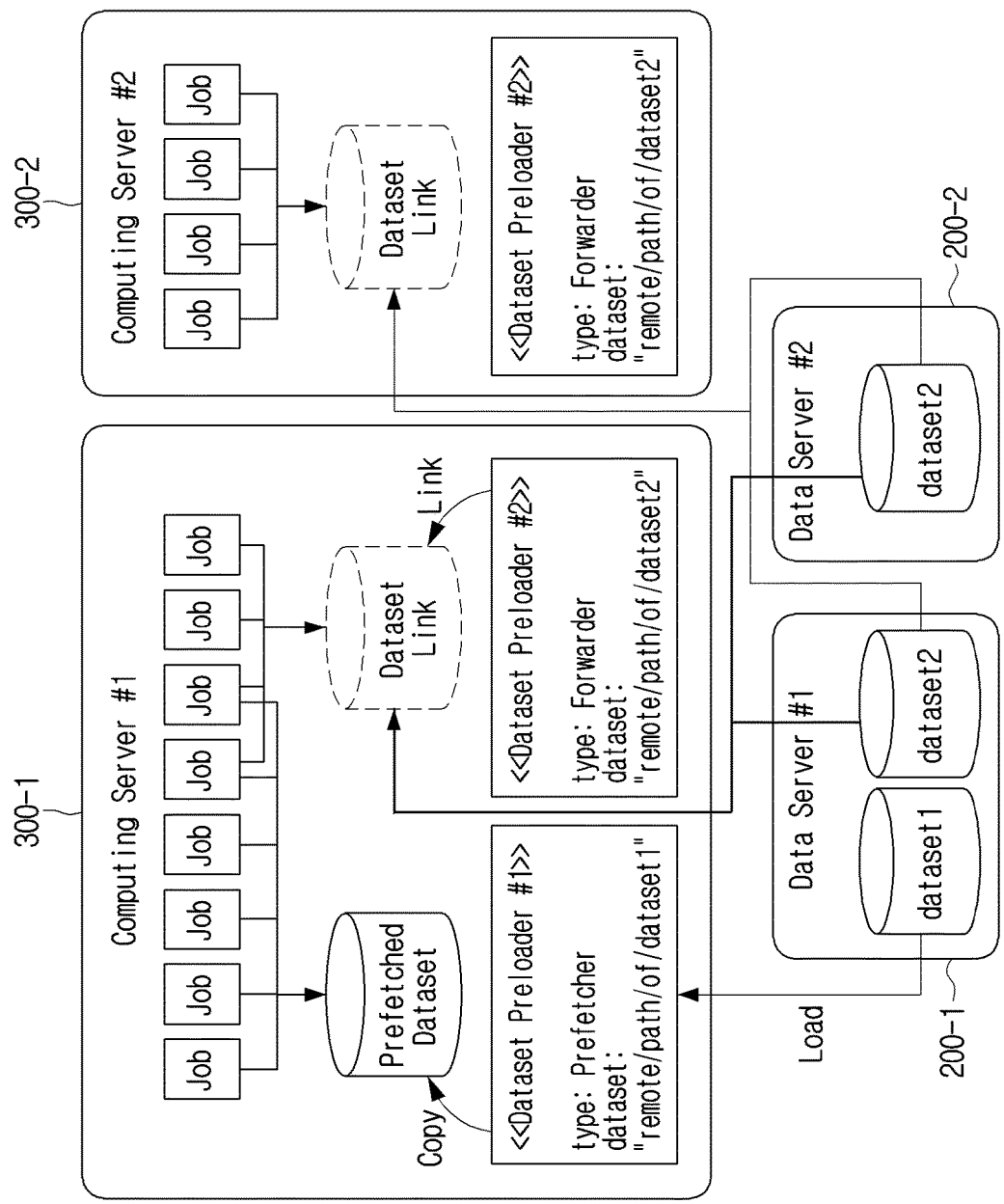
FIG. 8 is a diagram for illustrating a preloader according to an embodiment of the disclosure.

FIG. 8 is a diagram for illustrating a preloader according to an embodiment of the disclosure.

Referring to FIG. 8, the first computing device 300-1 according to an embodiment of the disclosure may execute the received preloader of the first type 125-1 based on information on the preloader of the first type 125-1 (prefetcher) corresponding to the dataset 1 and the dataset 1 received from the electronic apparatus 100, and thereby copy the dataset 1 stored in the first external storage device 200-1 and store the dataset 1 in the local memory of the first computing device 300-1.

Afterwards, when a job is executed according to the order in the queue 122, the processor 120 of the electronic apparatus 100 may identify the first computing device 300-1 in which the dataset 1 required for the job is preloaded, and control the communicator 110 to transmit a command for performing the job to the identified computing device 300-1.

In this case, the first computing device 300-1 may train the AI model by using the preloaded dataset 1 according to the received command. That is, the first computing device 300-1 may train the AI model by using the dataset 1 stored inside the first computing device 300-1.

The first computing device 300-1 according to another embodiment of the disclosure may execute the received preloader of the second type 125-2 based on information on the preloader of the second type 125-2 (forwarder) corresponding to the dataset 2 and the dataset 2 received from the electronic apparatus 100, and thereby generate a connecting link that may approach the dataset 2 stored in the first external storage device 200-1 or the second external storage device 200-2, and store the connecting link for the dataset 2 in the local memory of the first computing device 300-1. That is, in the memory, a connecting link that may be connected to the dataset 2, but not the dataset 2 itself, may be stored. The file size of the connecting link may be very small compared to the dataset 2.

Afterwards, when a job is executed according to the order in the queue 122, the processor 120 of the electronic apparatus 100 may identify the first computing device 300-1 in which the dataset 2 required for the job is preloaded, and control the communicator 110 to transmit a command for performing the job to the identified computing device 300-1.

In this case, the first computing device 300-1 may train the AI model by using the preloaded dataset 2 according to the received command. That is, the first computing device 300-1 may train the AI model by approaching the dataset 2 stored in the first external storage device 200-1 or the second external storage device 200-2 by using the connecting link for the dataset 2 stored inside the first computing device 300-1, and receiving the dataset 2.

Figure 9:
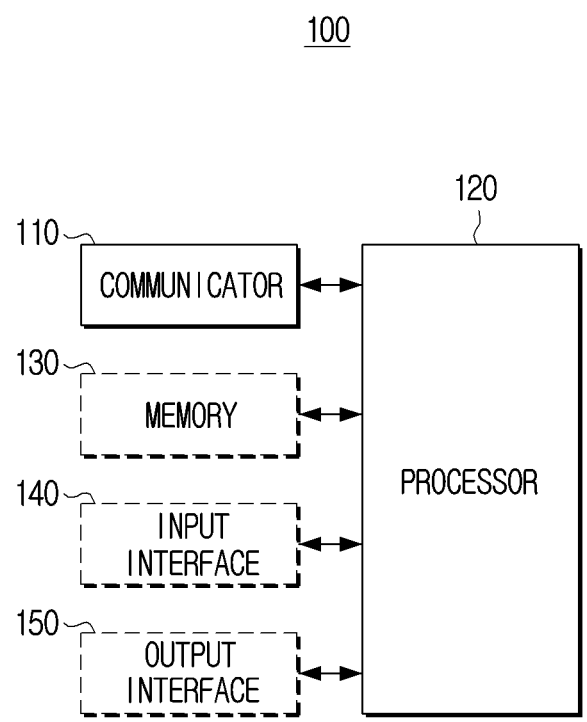
FIG. 9 is a block diagram for illustrating additional components of an electronic apparatus according to an embodiment of the disclosure.

FIG. 9 is a block diagram for illustrating additional components of an electronic apparatus according to an embodiment of the disclosure.

Referring to FIG. 9, the electronic apparatus 100 according to an embodiment of the disclosure may further include at least one of a memory 130, an input interface 140, or an output interface 150 other than the communicator 110 and the processor 120.

The memory 130 is a component for storing an operating system (OS) for controlling the overall operations of the components of the electronic apparatus 100 and various data related to the components of the electronic apparatus 100.

For this, the memory 130 may include hardware that temporarily or permanently stores data or information. For example, the memory 130 may be implemented as at least one hardware among a non-volatile memory, a volatile memory, a flash memory, a hard disk drive (HDD) or a solid state drive (SDD), a RAM, a ROM, etc.

In the memory 130, at least one instruction, program, or data to be used for the operation of the electronic apparatus 100 or the processor 120 may be stored. Here, an instruction is a code unit instructing the operation of the electronic apparatus 100 or the processor 120, and may have been drafted in a machine language which is a language that can be understood by a computer. A program may be a set of a series of instructions (an instruction set) that performs a specific job in a job unit. Data may be state information in bit or byte units that can express characters, numbers, images, etc.

The input interface 140 may receive various user commands and transmit the user commands to the processor 120. That is, the processor 120 may recognize a user command input from a user through the input interface 140. Here, a user command may be implemented in various ways such as a touch input of a user (e.g., via a touch panel), a key (e.g., via a keyboard) or a button (e.g., a physical button or a mouse, etc.) input, a user voice (e.g., via a microphone), etc.

The output interface 150 is a component that may output information, and for example, may be implemented as a display, or a speaker, etc. A display is a device that outputs information or data in a visual form. A display may display an image frame in one area or the entire areas of the display that may be operated as pixels. At least a part of a display may be combined with at least one of the front surface area, the side surface area, or the rear surface area of the electronic apparatus 100 in the form of a flexible display. A flexible display may be characterized in that it may be bent or curved or rolled without a damage through a thin and flexible substrate like paper. A speaker may directly output not only various kinds of audio data for which various processing jobs such as decoding or amplification, noise filtering, etc. have been performed by an audio processor (not shown) but also various kinds of notification sounds or voice messages as sounds.

Figure 10:
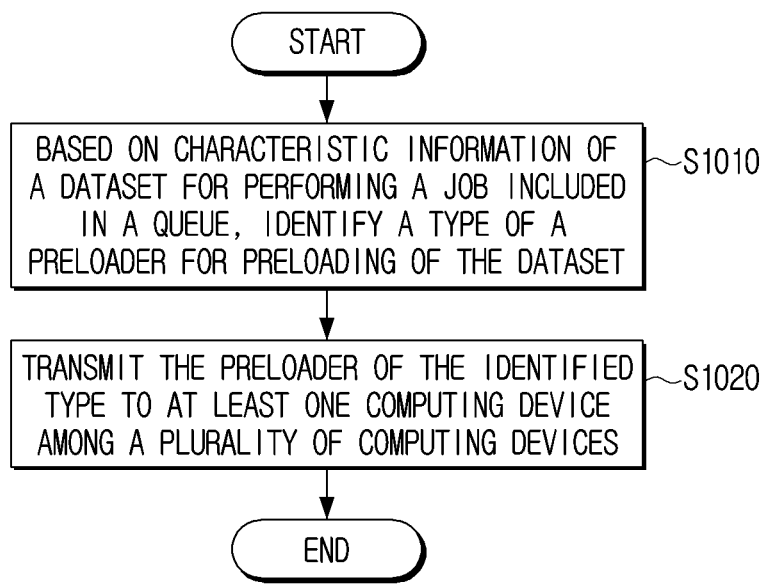
FIG. 10 is a flow chart for illustrating a controlling method of an electronic apparatus according to an embodiment of the disclosure.

FIG. 10 is a flow chart for illustrating a controlling method of an electronic apparatus according to an embodiment of the disclosure.

Referring to FIG. 10, a controlling method of the electronic apparatus 100 according to an embodiment of the disclosure may include an operation S1010 of, based on characteristic information of a dataset for performing a job included in a queue, identifying a type of a preloader for preloading of the dataset, and an operation S1020 of transmitting the preloader of the identified type to at least one computing device 300-1, 300-2, . . . , 300-n among the plurality of computing devices 300-1, 300-2, . . . , 300-n. The job may be a job for performing training of an AI model by using the dataset, and the preloder may include a preloader of a first type 125-1 and a preloader of a second type 125-2. The preloader of the first type 125-1 may copy the dataset stored in at least one external storage device 200-1, 200-2, . . . , 200-m for preloading of the dataset and store the dataset in the at least one computing device 300-1, 300-2, . . . , 300-n, and the preloader of the second type 125-2 may generate a connecting link for the dataset stored in the at least one external storage device 200-1, 200-2, . . . , 200-m for preloading of the dataset and store the connecting link in the at least one computing device 300-1, 300-2, . . . , 300-n.

Specifically, based on characteristic information of a dataset for performing a job included in a queue, a type of a preloader for preloading of the dataset may be identified in operation S1010.

For this, the controlling method may further include an operation of, if a user command requesting training of an AI model by using a dataset is received, arranging a job for performing training of the AI model in the queue.

Here, the characteristic information of a dataset may include at least one of the size of the dataset or the number of files of the dataset.

Then, the preloader of the identified type may be transmitted to the at least one computing device 300-1, 300-2, . . . , 300-n among the plurality of computing devices 300-1, 300-2, . . . , 300-n in operation S1020.

According to an embodiment of the disclosure, in the transmitting operation of S1020, in a case where the number of files included in a dataset is greater than or equal to a predetermined number, the preloader of the first type 125-1 may be transmitted to the at least one computing device 300-1, 300-2, . . . , 300-n, and in a case where the number of files included in the dataset is smaller than the predetermined number, the preloader of the second type 125-2 may be transmitted to the at least one computing device 300-1, 300-2, . . . , 300-n.

According to another embodiment of the disclosure, in the transmitting operation of S1020, in a case where the size of a dataset is smaller than a predetermined size, the preloader of the first type 125-1 may be transmitted to the at least one computing device 300-1, 300-2, . . . , 300-n, and in a case where the size of the dataset is greater than or equal to the predetermined size, the preloader of the second type 125-2 may be transmitted to the at least one computing device 300-1, 300-2, . . . , 300-n.

The controlling method according to an embodiment of the disclosure may include an operation of, based on preloading information received from the plurality of computing devices 300-1, 300-2, . . . , 300-n, identifying at least one computing device 300-1, 300-2, . . . , 300-n in which a dataset is preloaded among the plurality of computing devices 300-1, 300-2, . . . , 300-n.

Here, the controlling method may include an operation of, in an order in which a job is to be executed in the queue, if at least one computing device 300-1, 300-2, . . . , 300-n in which a dataset is preloaded is identified, transmitting a command for performing the job to the identified computing device 300-1, 300-2, . . . , 300-n, and the AI model may be trained by the identified computing device 300-1, 300-2, ..., 300-n by using the preloaded dataset according to the command.

The controlling method may include an operation of, in an order wherein a job is to be executed in the queue, if it is identified that there is no computing device 300-1, 300-2, ..., 300-n in which a dataset is preloaded, adjusting the job to the last order in the queue.

The controlling method may include an operation of, in a case where the number of jobs for which a dataset is required in the queue is greater than the number of the computing devices 300-1, 300-2, ..., 300-n in which a dataset is preloaded, transmitting the preloader of the identified type to at least one computing device 300-1, 300-2, ..., 300-n among the remaining computing devices 300-1, 300-2, ..., 300-n excluding the computing devices 300-1, 300-2, ..., 300-n in which a dataset is preloaded.

The controlling method may include the operation of, in a case where the number of jobs for which a dataset is required in the queue is smaller than the number of the computing devices 300-1, 300-2, ..., 300-n in which a dataset is preloaded, transmitting a command for deleting the preloader of the identified type to at least one computing device 300-1, 300-2, ..., 300-n among the computing devices 300-1, 300-2, ..., 300-n in which a dataset is preloaded.

The various example embodiments of the disclosure may be implemented as software including instructions stored in machine-readable storage media, which may be read by machines (e.g., computers). The machines refer to devices that call instructions stored in a storage medium, and may operate according to the called instructions, and the devices may include an electronic apparatus according to the aforementioned embodiments (e.g., an electronic apparatus 100). In a case where an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' means that a storage medium does not include signals only, and is tangible, but this term does not indicate whether data is stored in the storage medium semi-permanently or temporarily.

Also, methods according to the various embodiments may be provided while being included in a computer program product. A computer program product may be traded between a seller and a buyer. A computer program product may be distributed in the form of a storage medium that is readable by machines (e.g., a compact disc read only memory (CD-ROM)), or distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the various embodiments may include a singular object or a plurality of objects. Also, among the aforementioned sub components, some sub components may be omitted, or other sub components may be further included in the various embodiments. Alternatively or additionally, some components (e.g., a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Alternatively, at least some of the operations may be executed in a different order or omitted, or other operations may be added.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

According to the various example embodiments of the disclosure as described above, the disclosure may provide an electronic apparatus for improving efficiency of AI learning in a cloud platform, and a controlling method thereof. Also, the disclosure may adjust the number of computing devices according to the amount of learning data required for training of an AI model, and preload the learning data.

While the disclosure has been particularly shown and described with reference to embodiments thereof, it will be understood that various changes in form and details may be made therein without departing from the spirit and scope of the following claims.

What is claimed is:

1. An electronic apparatus comprising:
   a communication interface; and
   a processor configured to:
   based on characteristic information of a dataset to be used to perform a job included in a queue, identify a type of a preloader configured to preload the dataset; and
   control the communication interface to transmit the preloader of the identified type to at least one computing device among a plurality of computing devices,
   wherein the preloader includes a preloader of a first type and a preloader of a second type, wherein the preloader of the first type is configured to copy the dataset stored in at least one external storage device and store the dataset in the at least one computing device, wherein the preloader of the second type is configured to generate a connecting link for the dataset stored in the at least one external storage device and store the connecting link in the at least one computing device, wherein the job relates to performing training of an artificial intelligence (AI) model by using the at least one computing device based on the dataset, wherein the characteristic information of the dataset includes at least one of a size of the dataset or a number of files of the dataset, and wherein the processor is further configured to:
 based on the number of files included in the dataset being greater than or equal to a predetermined number, control the communication interface to transmit the preloader of the first type to the at least one computing device,
 based on the number of files included in the dataset being smaller than the predetermined number, control the communication interface to transmit the preloader of the second type to the at least one computing device,
 based on the size of the dataset being smaller than a predetermined size, control the communication interface to transmit the preloader of the first type to the at least one computing device, and
 based on the size of the dataset being greater than or equal to the predetermined size, control the communication interface to transmit the preloader of the second type to the at least one computing device.

2. The electronic apparatus of claim 1, wherein the processor is further configured to:
 based on preloading information received from the plurality of computing devices through the communication interface, identify at least one computing device in which the dataset is preloaded among the plurality of computing devices.

3. The electronic apparatus of claim 2, wherein the processor is further configured to:
 based on identifying the at least one computing device in which the dataset is preloaded, control the communication interface to transmit a command for performing the job to the identified at least one computing device.

4. The electronic apparatus of claim 2, wherein the processor is further configured to:
 based on identifying that there is no computing device in which the dataset is preloaded, adjust the job to be a last order in the queue.

5. The electronic apparatus of claim 2, wherein the processor is further configured to:
 based on a number of jobs for which the dataset is required in the queue being greater than a number of a computing device in which the dataset is preloaded, control the communication interface to transmit the preloader of the identified type to at least one computing device among remaining computing devices of the plurality of computing devices, excluding the computing device in which the dataset is preloaded.

6. The electronic apparatus of claim 2, wherein the processor is further configured to:
 based on a number of jobs for which the dataset is required in the queue being smaller than a number of computing devices in which the dataset is preloaded, control the communication interface to transmit a command for deleting the preloader of the identified type to at least one computing device among the computing devices in which the dataset is preloaded.

7. The electronic apparatus of claim 1, wherein the processor is further configured to:
 based on receiving a user command requesting training of the AI model by using the dataset, arrange the job in the queue.

8. A method of controlling an electronic apparatus, the method comprising:
 based on characteristic information of a dataset to be used to perform a job included in a queue, identifying a type of a preloader configured to preload the dataset; and
 transmitting the preloader of the identified type to at least one computing device among a plurality of computing devices,
 wherein the preloader includes a preloader of a first type and a preloader of a second type,
 wherein the preloader of the first type is configured to copy the dataset stored in at least one external storage device and store the dataset in the at least one computing device,
 wherein the preloader of the second type is configured to generate a connecting link for the dataset stored in the at least one external storage device and store the connecting link in the at least one computing device,
 wherein the job is related to performing training of an artificial intelligence (AI) model by using the at least one computing device based on the dataset,
 wherein the characteristic information of the dataset includes at least one of a size of the dataset or a number of files of the dataset, and
 wherein the transmitting comprises:
  based on the number of files included in the dataset being greater than or equal to a predetermined number, transmitting the preloader of the first type to the at least one computing device,
  based on the number of files included in the dataset being smaller than the predetermined number, transmitting the preloader of the second type to the at least one computing device,
  based on the size of the dataset being smaller than a predetermined size, transmitting the preloader of the first type to the at least one computing device, and
  based on the size of the dataset being greater than or equal to the predetermined size, transmitting the preloader of the second type to the at least one computing device.

9. The method of claim 8, further comprising:
 based on preloading information received from the plurality of computing devices, identifying at least one computing device in which the dataset is preloaded among the plurality of computing devices.

* * * * *